United States Patent [19]

Strickland

[11] 4,363,354
[45] Dec. 14, 1982

[54] SOLAR FURNACE SUPPORTING APPARATUS

[76] Inventor: Benjamin W. Strickland, Box 30, Joliet, Mont. 59041

[21] Appl. No.: 244,244

[22] Filed: Mar. 16, 1981

Related U.S. Application Data

[63] Continuation-in-part of Ser. No. 64,482, Aug. 7, 1979, Pat. No. 4,145,021.

[51] Int. Cl.³ .............................. F28F 9/00; F24J 3/02
[52] U.S. Cl. ..................................... 165/67; 126/424; 126/451; 250/491.1
[58] Field of Search ............... 126/424, 425, 438, 439, 126/450, 451, 417; 353/3; 165/67, 68, 80; 248/371, 185, 652; 250/491

[56] References Cited

U.S. PATENT DOCUMENTS

| 670,917 | 3/1901 | Eneas | 126/425 |
|---|---|---|---|
| 1,111,239 | 9/1914 | Smelser | 126/424 |
| 3,872,854 | 3/1975 | Raser | 126/424 |
| 4,078,549 | 3/1978 | McKeen et al. | 126/425 |
| 4,145,021 | 3/1979 | Gaecher et al. | 248/371 |
| 4,256,175 | 3/1981 | Strickland | 165/67 |
| 4,284,063 | 8/1981 | Watson | 126/425 |

Primary Examiner—James C. Yeung
Attorney, Agent, or Firm—Arthur L. Urban

[57] ABSTRACT

Solar furnace supporting apparatus including a frame portion, a furnace holding portion and an actuating portion, the frame portion including a base section and an upstanding section; the furnace holding portion being pivotally carried by the frame portion, the furnace holding portion including spaced longitudinal members, cross members connecting the longitudinal members adjacent the ends thereof, a supporting shaft disposed substantially perpendicular to the longitudinal members adjacent the centers thereof and being engageable with the frame portion adjacent the top of the upstanding section thereof, the actuating portion including cooperating flexible connectors operatively connected to at least one of the longitudinal members at points along the length thereof substantially equidistant from the supporting shaft, each of the cooperating flexible connectors having one end attached to the longitudinal member and extending downwardly in a converging relationship to at least one pair of adjoining parallel pulleys mounted on a freely rotatable first shaft disposed directly below and spaced from the supporting shaft and aligned substantially parallel thereto passing around at least a portion of the periphery of one of the adjoining pulleys, the flexible connectors passing around their respective pulleys in opposite directions, each of the flexible connectors extending from the pulleys to one of adjoining parallel driven drums affixed to a drum shaft disposed below and substantially parallel to the first shaft.

10 Claims, 5 Drawing Figures

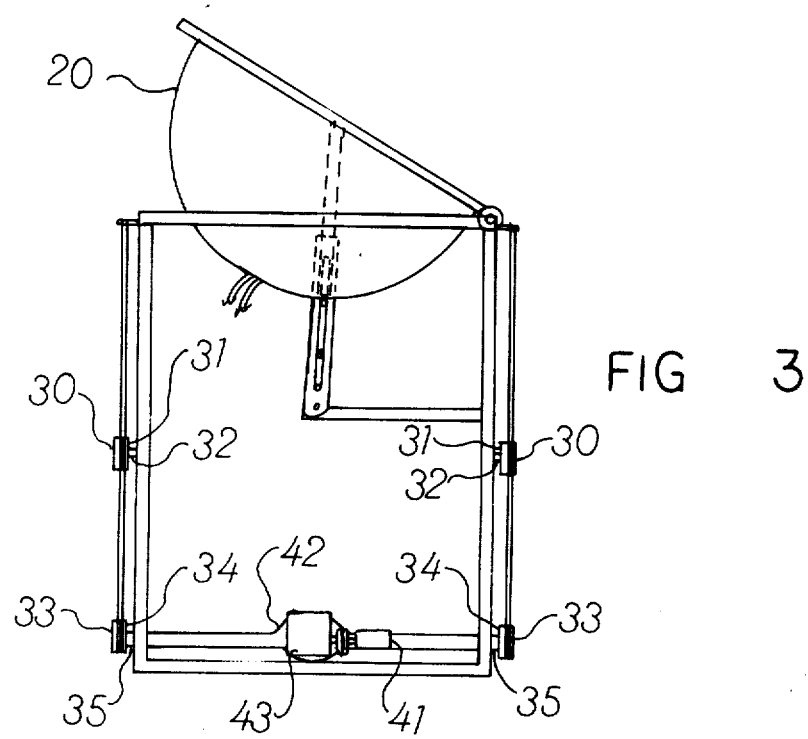
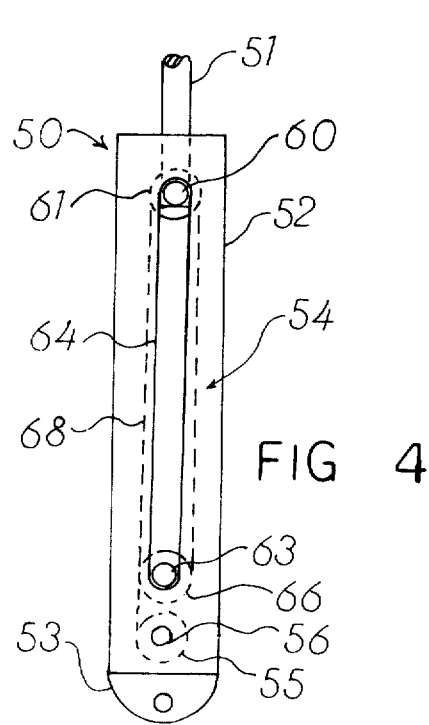
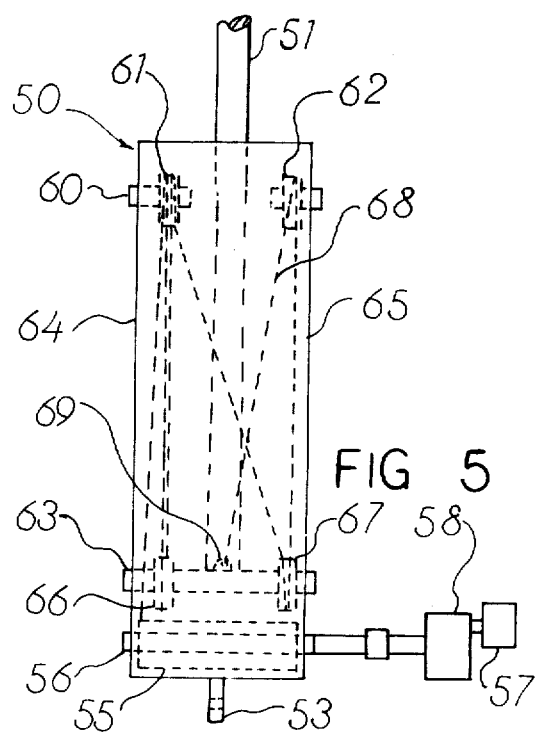

SOLAR FURNACE SUPPORTING APPARATUS

This application is a continuation-in-part of application Ser. No. 064,482 filed Aug. 7, 1979, now U.S. Pat. No. 4,145,021.

This invention relates to a novel supporting apparatus for solar equipment and more particularly relates to a new apparatus for supporting solar furnaces.

With the recent large increases in the cost of conventional energy sources such as electricity, petroleum and coal, both in the United States and foreign countries, a great deal of attention is being given to alternative energy sources. One energy source which is especially appealing is solar energy because of its unlimited supply and the absence of pollution and other ecological problems therewith.

A number of different solar energy systems have been proposed heretofore. Generally, these systems have involved the absorption of the heat from the sun by gases or liquids and the circulation thereof to areas requiring heat. If all the heat collected by the system is not needed when the sun is shining, the heated gases or liquids can be circulated to storage chambers where the heated fluid is stored. Also, the fluid is circulated through a heat absorbing material, such as a bed of rocks which will absorb and store the heat energy for future recovery.

Since solar energy itself is free, the principal costs of solar energy systems are the initial expenditures for the solar energy converting equipment and the subsequent expense of operating and maintaining the equipment. Ideally, it is desirable to increase the temperature of the gas or liquid as much as possible during each passage of the fluid through the equipment so that a minimum size of equipment will be required to accomplish the desired absorption of heat. Thus, improving the operating efficiency of a solar energy conversion system can result in a significant savings both in capital investment and in operating costs.

Much effort has been expended on ways to improve the efficiency of solar energy systems. One area of needed improvement is the design of the actual physical structures utilized. Generally, it has been found that the more complex is the system, the greater the energy recovery. However, since the costs ordinarily increase with the complexity of the systems, the cost per unit of energy recovered still is relatively high. Because the costs of solar energy systems to date has been quite large, the costs exceed the available resources of the ordinary individual. Thus, the government has offered tax credits and other incentives to increase the acceptance and use of solar energy systems. However, there has been criticism of such incentives since they in effect provide an advantage to one part of the population at the expense of other taxpayers.

The present invention provides a novel solar furnace supporting apparatus having advantages and features not present with systems currently available. The solar furnace supporting apparatus of the invention is simple in design and relatively inexpensive to manufacture. The supporting apparatus can be fabricated from commercially available components and materials. Also, conventional metal working fabrication techniques and procedures may be utilized in its manufacture.

The solar furnace supporting apparatus of the invention is of a design which facilitates partial fabrication at the manufacturing location with final erection taking place at the job site. Moreover, the erection of the apparatus may be accomplished without special tools. Furthermore, the design of the solar furnace supporting apparatus facilitates installation of furnaces individually or in groups as unitary structures. Thus, the apparatus of the invention provides a convenient means for generating energy both in limited quantities and also where large amounts of energy are required.

Other benefits and advantages of the novel solar furnace supporting apparatus of the present invention will be apparent from the following description and the accompanying drawings in which:

FIG. 3 is a side view of the solar furnace supporting apparatus shown in FIGS. 1 and 2.

FIG. 4 is an enlarged side view partially in section of the tilting mechanism of the furnace supporting apparatus shown in FIG. 3; and FIG. 5 is an end view partially in section of the tilting mechanism shown in FIG. 4.

Figure 1:
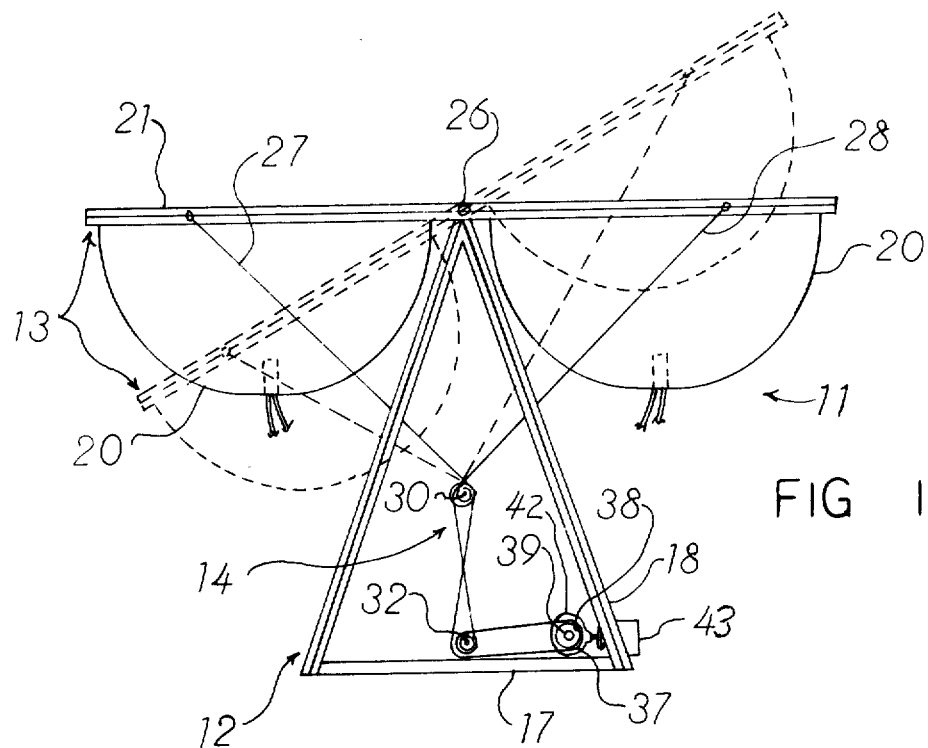
FIG. 1 is a side view of one form of the solar furnace supporting apparatus of the invention.
Figure 2:
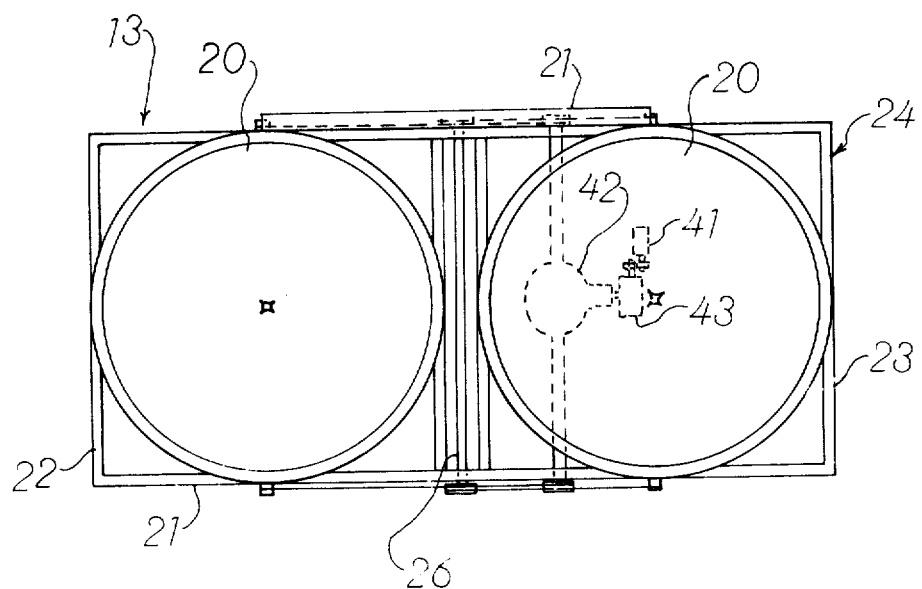
FIG. 2 is a top view of the solar furnace supporting apparatus shown in FIG. 1.

As shown in the drawings, one form of the novel solar furnace supporting apparatus 11 of the present invention includes a frame portion 12, a furnace holding portion 13 and an actuating portion 14. Advantageously, the furnace holding portion 13 is supported on frame portion 12 adjacent the center of the holding portion.

The frame portion 12 includes a base section 17 and an upstanding section 18. The upstanding section 18 advantageously includes a frame which preferably is disposed in an A-frame configuration.

The furnace holding portion 13 is pivotally carried by frame portion 12. The furnace holding portion 13 includes spaced longitudinal members 21 and cross members 22 and 23 connecting the longitudinal members adjacent the ends thereof. The longitudinal members 21 and the cross members 22 and 23 form a framework 24 for two solar furnaces 20. The furnaces 20 are mounted on the holding portion 13 with the two furnaces 20 and the framework 24 being capable of moving as a single unit.

The furnace holding portion 13 which is pivotally mounted on frame portion 12 also includes supporting shaft means 26. Supporting shaft 26 is disposed substantially perpendicular to longitudinal members 21 adjacent the centers thereof. The ends of shaft 26 advantageously extend beyond the longitudinal members 21 and are engageable with the frame portion 12. Shaft 26 is engageable with the frame portion 12 adjacent the top of the upstanding section 18 thereof.

The actuating portion 14 includes cooperating flexible connecting means shown as cables 27 and 28. Cables 27 and 28 are operatively connected to at least one and preferably both of the longitudinal members 21. The cables 27 and 28 are connected to a longitudinal member 21 at points along the length thereof substantially equidistant from the supporting shaft 26.

Each of the cables 27 and 28 has one end attached to the longitudinal member 21 and extends downwardly in a converging relationship to at least one pair of adjoining parallel pulleys 30 and 31. Pulleys 30 and 31 are mounted on a freely rotatable first shaft 32 disposed directly below and spaced from supporting shaft 26. Shaft 32 is aligned substantially parallel to shaft 26.

Each of the cables 27 and 28 passes around at least a portion of the periphery of pulley 30 or 31. Each cable 27 or 28 passes around its respective pulley in a direction opposite to the direction that the other cable passes around its pulley. For example, cable 27 passes clockwise around its pulley 30 while cable 28 passes around pulley 31 in a counterclockwise direction.

Advantageously, the cables 27 and 28 cross each other and extend downwardly to a second pair of pulleys 33 and 34 which are similar to pulleys 30 and 31. Pulleys 33 and 34 are mounted on a second freely rotatable shaft 35 disposed below the first shaft near base section 17 of frame portion 12. Second shaft 35 also is aligned substantially parallel to first shaft 26.

Each of the flexible cables 27 and 28 extends from the pair of pulleys to one of adjoining drums 37 and 38. The drums 37 and 38 are affixed to a drum shaft 39 substantially parallel to the supporting shaft 26. The drum shaft 39 is operatively connected to suitable drive means. Advantageously, as shown in the drawings, the drum shaft 39 is connected to drive means including an electrical motor 41 through a differential gear arrangement 42. This is particularly desirable when cables are located on both sides of the furnace holding portion 14. Preferably, the drive means also includes a worm gear box 43. The use of the differential 42 and worm gear 43 provides positive control of the cable winding and thus the movement of the furnaces. This is particularly important when an automatic tracking apparatus is employed to control the movement of the furnaces.

The above described arrangement of cables 27 and 28 with the pulleys 30 and 31 and the drums 37 and 38 provides movement of the furnace holding portion 13 so that it will be oriented to face the sun continuously during daylight hours. To compensate for seasonal changes in the positioning of the sun, means are provided for tilting the furnace holding portion 13 about one of the longitudinal members 21. This rotation may be accomplished with a variety of means such as hydraulic cylinders and similar expedients.

Advantageously, as shown in the drawings, the tilting may be effected through an arrangement utilizing a telescoping member 50. The telescoping member 50 includes a rod section 51 slidable within a guide section 52. The upper end of the rod section 51 is pivotally connected to the furnace holding portion 13, preferably adjacent the transverse center line thereof. The lower end of the guide section 52 is pivotally connected to a support 53 or other fixed location on the frame portion 12.

Extension of the telescoping member 50 may be performed through a cable and pulley arrangement 54. The cable and pulley arrangement 54 includes a winding drum 55 on a shaft 56 disposed adjacent the lower end of guide section 52. An electrical motor 57 and preferably a worm gear box 58 may be employed to drive the winding drum 55. Adjacent the upper end of guide section 52 is located a fixed shaft 60. Shaft 60 has a pair of freely rotatable pulleys 61 and 62 mounted thereon.

The lower end of rod section 51 is secured to a second shaft 63. Shaft 63 is disposed substantially parallel to shaft 60 and movable toward and away therefrom. This may be accomplished by having the ends of shaft 63 extend through longitudinal slots 64 and 65 in guide section 52. A pair of pulleys 66 and 67 are mounted for free rotation on shaft 63.

Cable 68 of the cable and pulley arrangement 54 has one end affixed to drum 55 and extends upwardly therefrom over pulley 61, then around lower pulley 64, back up over a second section of pulley 61, down around pulley 65, up over pulley 62 and then down to shaft 63 to which it may be secured with an eye 69.

In the operation of the solar furnace supporting apparatus 11 of the invention as shown in the drawings, solar furnaces 20 are mounted in the furnace holding portion 13 formed by longitudinal members 21 and cross members 22 and 23. The furnaces 20 are oriented with their openings facing in the same direction. The furnaces 20 may be secured to the framework 24 by suitable brackets and fasteners (not shown).

The furnace holding portion 13 is oriented to face toward the sun as the sun moves across the sky from sunup to sundown. This is accomplished by periodically actuating motor 41. Actuation of motor 41 causes drum shaft 39 to rotate the drums 37 and 38 affixed thereto. Rotation of the drums causes one of the cables 27 or 28 to wind onto its drum 37 or 38 while the other cable is unwound from its drum. The lengthening of one cable and the shortening of the other causes the furnace holding portion 13 to rotate about supporting shaft 26 so that the end of the framework 24 to which the shortening cable is attached will be raised to an elevated position. In this way, the furnaces 20 can face the sun during all of the daylight hours. The solid line drawing in FIG. 1 of furnace holding portion 13 represents the position thereof at noon or in a locked position. The dotted line representation of the furnace holding portion 13 with furnaces 20 inclined to the left in FIG. 1 illustrates a morning or afternoon position.

To compensate for the seasonal changes in the location of the sun, telescoping member 50 is lengthened or shortened only slightly each day. This may be accomplished by actuating motor 57. Actuation of motor 57 causes rotation of shaft 56 and winding drum 55 affixed thereto. Rotation of drum 55 causes the end of cable 68 to be wound thereon or released therefrom. This lengthening or shortening of the cable 68 causes shafts 60 and 63 to be drawn toward or away from one another.

Since shaft 63 is affixed to the lower end of rod section 51, as the spacing between the shafts 60 and 63 changes, the overall effective length of the telescoping member 50 also will be changed. With the upper end of the rod section 51 being affixed to the furnace holding portion 13, the changes in the length of the telescoping member 50 will change the inclination of the furnaces 20 toward the sun. If desired, the telescoping member 50 also can be utilized to lower the furnace holding portion 13 to a horizontal position at night or in windy conditions that might damage the furnaces 20 in an inclined position.

The solar furnaces may be connected to a fluid circulating heating system (not shown) for heating one or more dwellings, businesses, etc.

The above description and the accompanying drawings show that the present invention provides a novel solar furnace supporting apparatus which can maintain the orientation of the furnaces toward the sun easily. The solar furnace supporting apparatus of the invention can be fabricated from commercially available components and materials relatively inexpensively. Conventional metal working manufacturing techniques can be utilized in the fabrication of the apparatus.

The solar furnace supporting apparatus of the invention is of a design which enables the apparatus to be fabricated partially at the manufacturing location if desired with the completion of the erection taking place at the job site. The erection of the apparatus may be accomplished by semi-skilled labor with a minimum of instruction and without special tools.

The design of the solar furnace supporting apparatus is adaptable to groups of solar furnaces as well as individual or pairs of units. As a result, the supporting apparatus of the invention provides a convenient means for generating limited quantities of energy such as for a single dwelling as well as larger quantities of energy for businesses, apartments, groups of dwellings and the like.

It will be apparent that various modifications can be made in the particular solar furnace supporting apparatus described in detail above and shown in the drawings within the scope of the invention. For example, the size, configuration and arrangement of the components can be changed to meet specific requirements. The structural members utilized in the fabrication of the support apparatus may be round or square tubing, flat or angle members and the like. Also, bracing members may be added to provide the desired or required rigidity to the structure. Therefore, the scope of the invention is to be limited only by the following claims.

What is claimed is:

1. Solar furnace supporting apparatus including a frame portion, a furnace holding portion and an actuating portion, said frame portion including a base section and an upstanding section; said furnace holding portion being pivotally carried by said frame portion, said furnace holding portion including spaced longitudinal members, cross members connecting said longitudinal members adjacent the ends thereof, supporting shaft means disposed substantially perpendicular to said longitudinal members adjacent the centers thereof, said supporting shaft means being engageable with said frame portion adjacent the top of said upstanding section thereof, said actuating portion including cooperating flexible connecting means operatively connected to at least one of said longitudinal members at points along the length thereof substantially equidistant from said supporting shaft means, each of said cooperating flexible connecting means having one end attached to said longitudinal member and extending downwardly in a converging relationship to at least one pair of adjoining parallel pulleys mounted on a freely rotatable first shaft disposed directly below and spaced from said supporting shaft means and aligned substantially parallel thereto, each of said flexible connecting means passing around at least a portion of the periphery of one of said adjoining pulleys, said flexible connecting means passing around its respective pulley in a direction opposite to that the other flexible connecting means passes around its pulley, each of said flexible connecting means extending from said pulleys to one of adjoining parallel drum means affixed to a drum shaft disposed below and substantially parallel to said first shaft, said drum shaft being operatively connected to drive means; whereby actuating said drive means rotates said drum shaft causing one of said flexible connecting means to wind onto one drum while simultaneously delivering said flexible connecting means from the other of said drums, with the lengthening and shortening of the effective lengths of said flexible connecting means causing one end of said furnace holding portion to be lowered while the opposite end of said holding portion is raised to an elevated position.

2. Solar furnace supporting apparatus according to claim 1 including a second pair of adjoining pulleys mounted on a freely rotating second shaft intermediate said first shaft and said drum shaft, each of said flexible connecting means passing around at least a portion of the periphery of one of said second pulleys, said flexible connecting means passing around the respective pulley in a direction opposite to that of the other of said flexible connecting means.

3. Solar furnace supporting apparatus according to claim 1 wherein said drive means includes worm gear means.

4. Solar furnace supporting apparatus according to claim 1 wherein said drive means includes differential gear means.

5. Solar furnace supporting apparatus according to claim 1 wherein said flexible connecting means includes a pair of cables.

6. Solar furnace supporting apparatus according to claim 1 wherein said actuating portion includes means capable of tilting said furnace holding portion about one longitudinal member as an axis.

7. Solar furnace supporting apparatus according to claim 6 wherein said tilting means includes a telescoping member capable of being lengthened with a cable and pulley arrangement.

8. Solar furnace supporting apparatus according to claim 1 wherein said upstanding section of said frame portion includes A-frame sections.

9. Solar furnace supporting apparatus according to claim 1 wherein said furnace holding portion is of a generally rectangular configuration.

10. Solar furnace supporting apparatus according to claim 1 wherein said furnace holding portion is capable of holding two furnaces.

* * * * *